United States Patent [19]
Elwalid et al.

[11] Patent Number: 5,978,356
[45] Date of Patent: Nov. 2, 1999

[54] TRAFFIC SHAPER FOR NETWORK NODES AND METHOD THEREOF

[75] Inventors: Anwar Elwalid, Murray Hill; Debasis Mitra, Summit, both of N.J.

[73] Assignee: Lucent Technologies Inc., Murray Hill, N.J.

[21] Appl. No.: 08/838,395

[22] Filed: Apr. 9, 1997

[51] Int. Cl.[6] .................................. H04J 1/16; H04J 3/14
[52] U.S. Cl. ............................................. 370/230; 370/233
[58] Field of Search .................................... 370/229, 230, 370/232, 233, 252, 253, 234, 235; 395/200.62, 200.63, 200.64, 200.65

[56] References Cited

FOREIGN PATENT DOCUMENTS 0 702 473   3/1996   European Pat. Off. .
0 706 297   4/1996   European Pat. Off. .

OTHER PUBLICATIONS

"A New Approach for Allocating Buffers and Bandwidth to Heterogeneous, Regulated Traffic in an ATM Node", by A. Elwalid; D. Mitra; and R. H. Wentworth. *IEEE* vol. 13, No. 6 Aug. 1995. pp. 1115–11127.

*Primary Examiner*—Ajit Patel
*Attorney, Agent, or Firm*—Julio Garceran

[57] ABSTRACT

The traffic shaping system according to the principles of the present invention increases the connection-carrying capacity of a network node by shaping the data cells to increase the admissible number of connections. In accordance with certain embodiments of the present invention, the traffic shaping system uses a data buffer at the ingress of the network node to selectively buffer classes of data cells. As such, the traffic shaping system exploits differences in delay tolerances between traffic classes to shape the less delay sensitive traffic classes to reduce the effective bandwidth of a connection of the particular traffic class and thereby increase the nodal connection-carrying capacity. Certain embodiments of the traffic shaping system operate within a framework to provide parameters for the traffic shaping system which increase the connection-carrying capacity for the node while meeting quality of service requirements for the data cells. In accordance with certain embodiments, an integrated regulator and shaper is provided which concurrently regulates and shapes the traffic cells to increase the nodal connection-carrying capacity.

17 Claims, 9 Drawing Sheets

TRAFFIC SHAPER FOR NETWORK NODES AND METHOD THEREOF

BACKGROUND OF THE INVENTION

1. Field of the Invention

This invention relates to network communication and, more particularly, to traffic shaping at network nodes for increasing the nodal connection-carrying capacity.

2. Description of Related Art

Networks are a principle way of exchanging or transferring information, such as signals representing voice, audio, text or video among communication devices. Such communication devices include devices for sending and/or receiving information, such as computer terminals, multimedia workstations, facsimile machines, printers, servers and telephones. The exchange or transfer of information is referred to as a call or connection. Information transmitted on the network can be of many different forms but is often formatted into fixed-length packets or cells.

A network typically includes switching nodes having ports coupled by links to ports of other switching nodes and to the communications devices. Each link is uni- or bi-directional and is characterized by a bandwidth or link capacity. Information to be exchanged is often conveyed over a path comprising a set of nodes and links connecting the communication devices. The path can be regarded as a virtual circuit (VC) whereby one communication device specifies the intended destination for the information, and the network delivers the information as though a dedicated circuit connected the two communication devices. Cells in transit between communication devices may temporarily be stored in buffers at nodes along the path of the virtual circuit pending sufficient available bandwidth on subsequent links along the path.

Networks, such as broadband ISDN (BISDN) employing asynchronous transfer mode (ATM) packet switching, are increasingly being used for the reliable, high-speed transmission of information. This increased use has brought major changes in network architecture and infrastructure design as well as in network operations and/or in the classes of services offered over the network. Classes of services offered over a network can include, for example, video-on-demand and video teleconferencing. Moreover, particular classes of services, such as video teleconferencing, are relatively sensitive to routing delays and receive higher priorities than other service classes, such as video-on-demand, which are relatively delay insensitive.

To obtain high revenues from a network, it is advantageous for network managers to operate the network at a relatively high call capacity, i.e. establishing and maintaining a large number of simultaneous VC's. The issue of congestion control is intertwined with the notion of the capacity of the network measured in users for given quality of service, and the administration of admission control in real-time, where the goal is to admit users up to capacity. The statistical nature of a significant part of the traffic, its burstiness and variability, and the stringency of the quality of service requirements combined pose challenges. An essential prerequisite in dealing with these challenges is the regulation of traffic at network edges.

Buffer memories are typically employed in the nodes to increase the number of VC's carried by the node by buffering transmission of data cells that are relatively delay insensitive while buffering to a lesser extent transmission of those data cells that are relatively delay sensitive. Such buffer memories, which can be relatively expensive, effectively operate as respective queues in the node for the data cells that are to be conveyed through the respective ports.

Therefore, a system is required to enhance the connection-carrying capacity for the network nodes in an efficient and cost-effective manner.

SUMMARY OF THE INVENTION

The traffic shaping system according to the principles of the present invention increases the connection-carrying capacity of a network node by shaping the data cells to increase the admissible number of connections. In accordance with certain embodiments of the present invention, the traffic shaping system uses a data buffer at the ingress of the network node to selectively buffer classes of data cells. As such, the traffic shaping system exploits differences in delay tolerances between traffic classes to shape the less delay sensitive traffic classes to reduce the effective bandwidth of a connection of the particular traffic class and thereby increase the nodal connection-carrying capacity. Certain embodiments of the traffic shaping system operate within a framework to provide parameters for the traffic shaping system which increase the connection-carrying capacity for the node while meeting quality of service requirements for the traffic cells. In accordance with certain embodiments, an integrated regulator and shaper is provided which concurrently regulates and shapes the traffic cells to increase the nodal connection-carrying capacity.

BRIEF DESCRIPTION OF THE DRAWINGS

Other aspects and advantages of the present invention may become apparent upon reading the following detailed description and upon reference to the drawings in which.

DETAILED DESCRIPTION

Illustrative embodiments of the traffic shaping system according to the principles of the present invention are described below which increase the capacity of a network node by shaping data cells at the point of ingress into the network or subnetwork. The traffic shaping system includes a method of selecting shaping parameters for the traffic shaping system to enhance the capacity of the node, which is measured in terms of carried connections. The traffic shaping system can be used in various different nodes and network configurations. The traffic shaping system, however, is being described for use in packet/cell switch network, including ATM and Internet Protocol (IP).

Figure 1:
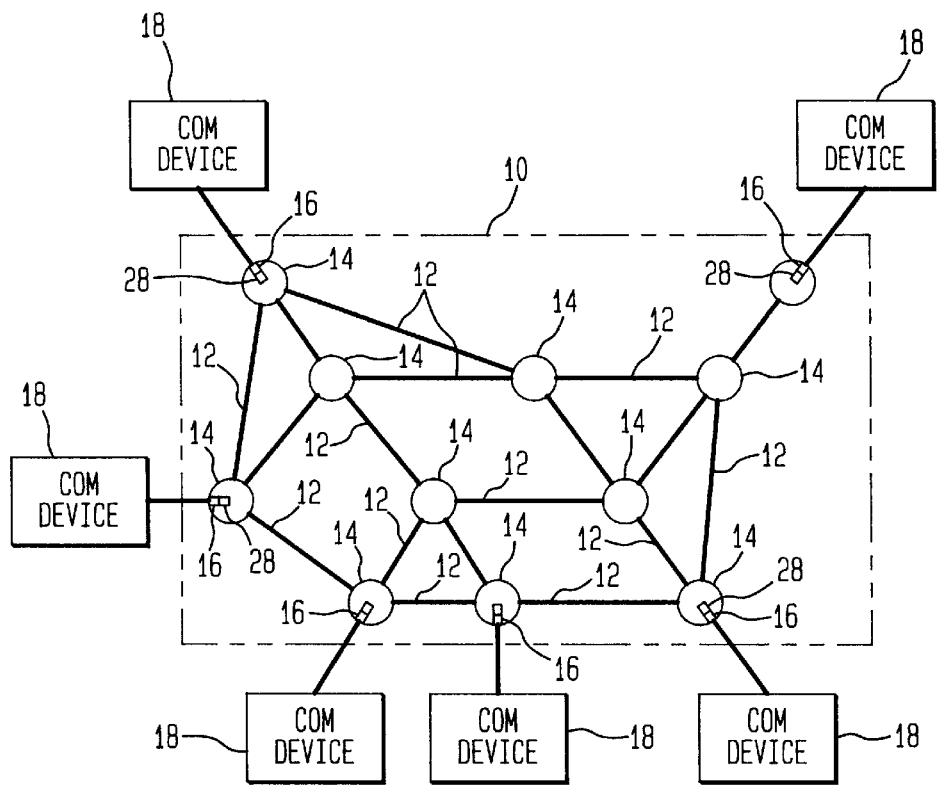
FIG. 1 shows a packet/cell switch network in which the traffic shaping system according to the principles of the present invention can be used.

FIG. 1 illustrates a packet/cell switch network 10 in which the traffic shaping system can be practiced. Network 10 comprises communication links 12 coupling particular nodes 14. It is possible for the number of links 12 connected to a node 14 to be on the order of 512 or greater. Each link 12 possesses a respective capacity of data packets that can be conveyed over the link per unit of time which is typically referred to as the link's bandwidth. Exemplary links having bandwidths of approximately 622 MB/sec have been used in certain BISDN networks.

Packets or cells are units of data that are addressed with routing information. It is possible for the packets to be of fixed or variable length. Exemplary packets include ATM cells having a fixed length of 53 bytes. Additionally, packets in a higher protocol layer may have a longer length and are typically referred to as messages which can be subdivided to generate a plurality of cells for ATM switching.

It is possible for one or more of the nodes to be located within a particular network switch, such as ATM data switches commercially available from Lucent Technologies Inc., Murray Hill, N.J., including Lucent's GlobeView 2000 switches. Particular nodes are coupled to access regulators 16 which are coupled to communication devices 18. The communication devices 18 are typically employed by service providers and users to enable the users to request and obtain services, such as video-on-demand or video conferencing. The access regulators 16 regulate the flow or rate of data packets from the communication devices 18 into the network 10 according to a function characterized by a set of access regulator parameters. In this particular embodiment for example, the access regulators 16 are dual leaky bucket regulators (DLBR). However, other types of regulators can be used, including leaky buffer regulators, buffered leaky bucket regulators or cascaded leaky bucket regulators.

When a communication device 18 wishes to transmit information to another communication device 18 via network 10, a virtual circuit (VC) is requested. A VC is a path comprising a set of nodes and links. Each node 14 in this particular embodiment has associated with it at least one buffer of size $B_j$, and each link has an associated bandwidth capacity $C_k$. Routing the requested VC on the path will require network resources, e.g. buffer space in the nodes along the path and bandwidth in the links along the path. Moreover, before the requested VC can be routed, the network resources that are required must be determined so that a path can be selected which selected path has sufficient resources to accommodate the VC. In other words, if communications device 18 has a certain buffer requirement in the nodes and a certain bandwidth requirement in the links, the requested VC should be routed only on those paths comprising notes and links with sufficient resources to meet the certain requirements. A. Elwalid, D. Mitra and R. H. Wentworth, "A New Approach for Allocating Buffers and Bandwidth to Heterogeneous, Regulated Traffic in an ATM Node," I.E.E.E. J. Selected Areas in Communications, Vol. 13, No. 6, August 1995 and U.S. patent application Ser. No. 08/506,160 filed Jul. 24, 1995 to Elwalid et al., herein incorporated by reference, describe admission control and routing by determining required network resources.

Information provided to the network 10, such as data, text, voice, video, etc., can be characterized by a traffic envelope, which bounds the cumulative traffic provided over multiple time scales or a bandwidth buffer curve. In the basic case, the traffic envelope is characterized by a set of parameters, including the long term average transmission rate r, peak rate P and maximum burst tolerance $B_T$. The value of each information parameter in the set of information parameters is based on a particular quality or class of service, for example, contracting terms with the network provider for a maximum cell loss rate or delay time and for appropriate access regulator parameters which can be for instance, the rate at which data packets flow into the network 10. It is also possible for the particular grade of service to be based on priority levels of the data packets.

Figure 2:
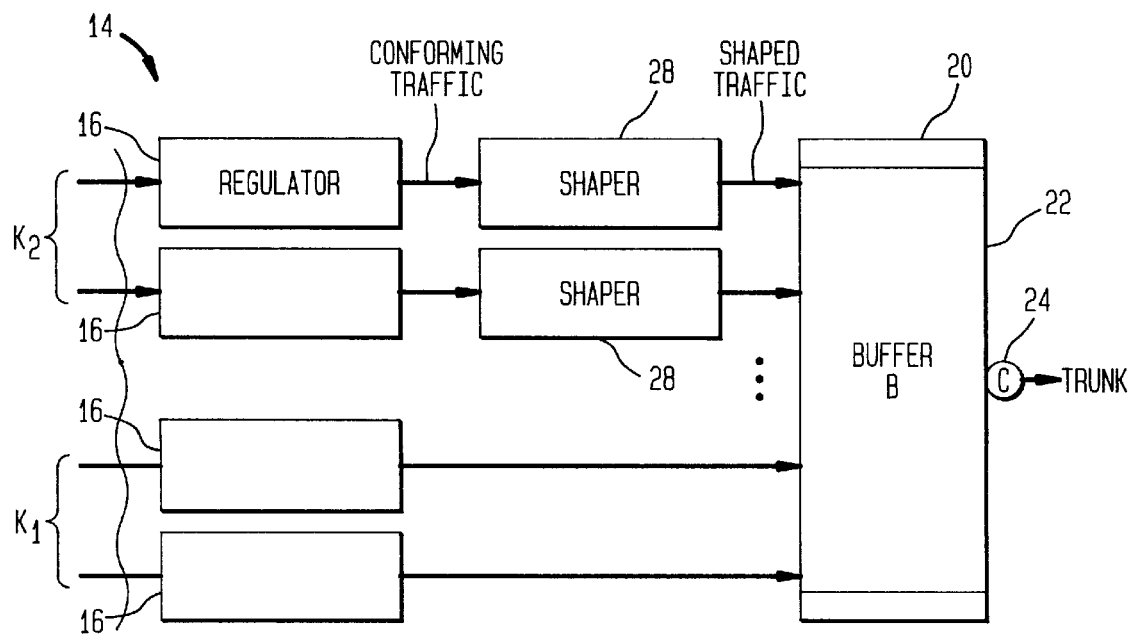
FIG. 2 is a block diagram showing how certain embodiments of the traffic shaping system can be used in a network node to exploit differences in delay tolerances between traffic classes.

The traffic shaping system according to the principles of the present invention can exploit the differences in delay tolerances between more time-sensitive traffic classes and less time-sensitive traffic classes, such as real time and non-real time, to shape and smooth the less delay sensitive traffic and increase the capacity of the network node 14 by increasing the number of admissible connections. FIG. 2 shows a basic configuration of a network node 14 using the traffic shaping system at the ingress to a node to exploit the differences in delay tolerances between two different traffic classes to increase nodal capacity. $K_1$ sources, which can be heterogeneous, provide data packets conforming to the parameters of the access regulators 16, which can also be heterogeneous.

In this particular embodiment, the $K_1$ regulated sources are more time delay sensitive and have a maximum delay tolerance D. In this particular embodiment, the $K_1$ regulated sources feed directly into a FIFO statistical multiplexer 20 with a buffer 22 of size B and an output port 24 or trunk of transmission bandwidth C. As such, the delay requirements for the $K_1$ regulated sources are satisfied if $B/C<=D$. The $K_2$ regulated sources, which can be heterogeneous, are less delay sensitive and have a delay tolerance of $D+D_S(D_s>0)$. A shaper 28 can use the extra permissible delay to shape the data traffic. By shaping the data traffic for the less delay sensitive traffic, the admissible number of nodal connections increases, thereby increasing the capacity of the network node 14.

Figure 3:
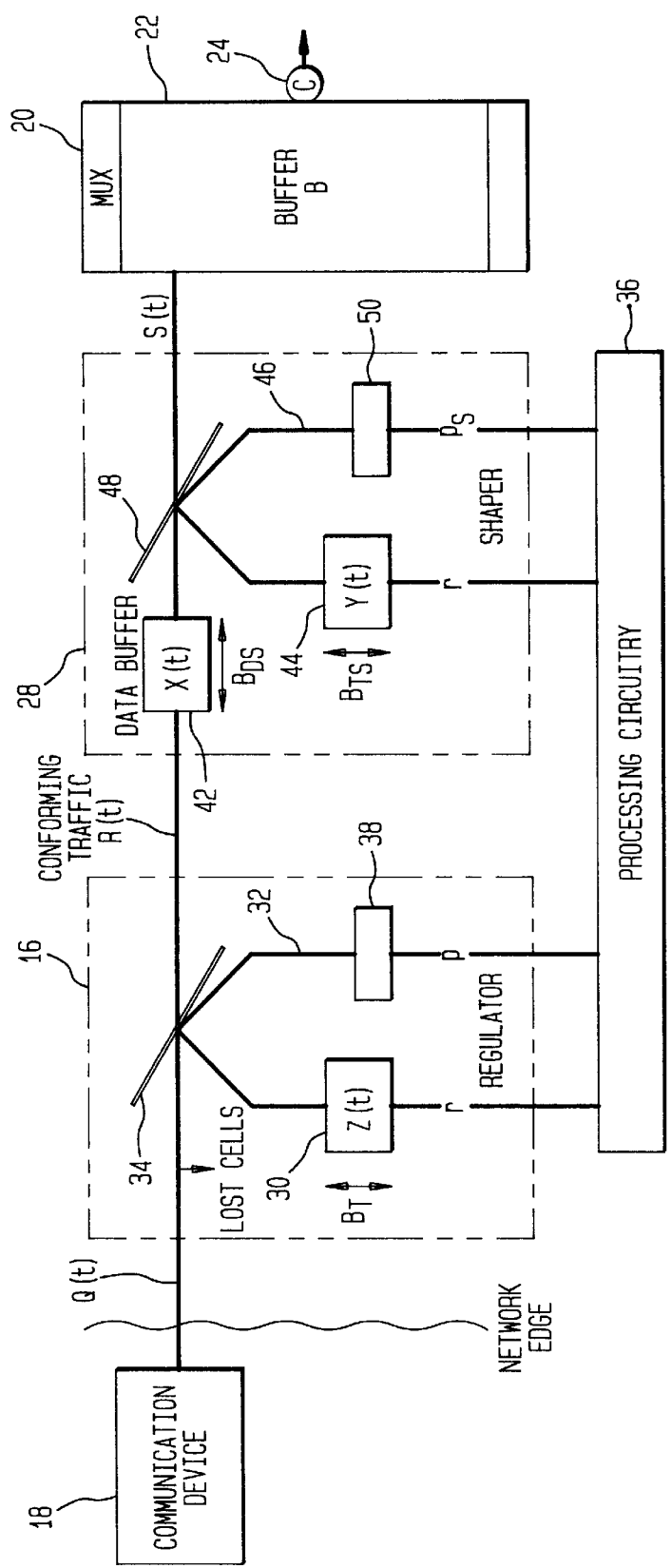
FIG. 3 shows a traffic shaping system according to the principles of the present invention.

FIG. 3 shows a particular embodiment of a traffic shaping system according to certain principles of the present invention. In this particular embodiment, the is regulator 16 is a dual leaky bucket regulator (DLBR)16. In other embodiments, the regulator 16 consists of other regulators or multiple cascaded leaky bucket regulators which constrain the traffic to fit a certain profile. For example, the regulator 16, instead of being a dual leaky bucket regulator 16 can be a triple leaky bucket regulator, a quadruple leaky bucket regulator or, more generally, a multiple leaky bucket regulator.

A data packet or cell arrives at the input of the DLBR 16. If a token is available both in a token buffer 30 and on a P line 32, join circuitry 34 permits the data packet to be output from the DLBR 16. The join circuitry 34 could be implemented using conventional logic and switch components as would be understood by one of ordinary skill in the art with the benefit of this disclosure. In this particular embodiment, the token buffer 30 can be implemented as a counter which is clocked at rate r as provided by processing circuitry 36 of the network node 14. The counter is incremented at the rate r and decremented when a token is used to output a data packet from the DLBR 16. In this particular embodiment, the P line 32 includes a P line token buffer 38 which is capable of holding one token. Tokens arriving to the token buffer 38 when there is a token in store are lost. The P line token buffer 38 can also be implemented by a counter which is incremented at the rate P and decremented when the token is used to output the data packet from the DLBR 16.

The token buffer 30 is capable of holding $B_T$ tokens. Tokens are supplied to the token buffer 30 at rate r, and a token is used when a data packet is output from the DLBR 16. Tokens arriving at the token buffer 30 when the token buffer is full are lost (overflow). In this particular embodiment, the P line token buffer 38 receives tokens at the peak rate P, and the P line token buffer 38 is capable of holding a single token which is used when a data packet is output from the DLBR 16. In general, since P>r, the output rate of the data packets from the DLBR 16 is bound by the rate r. However, during data bursts when the token buffer 30 has tokens available for example, the data packets are output from the DLBR 16 at the peak rate P. Thus, the DLBR 16 can be characterized by three parameters: r is the mean sustainable rate or token rate which bounds the long-term average rate of the regulated traffic; $B_T$, is the burst tolerance or the token buffer size which bounds the burst size; and P is the peak rate, which bounds the rate at which data packets are output from the DLBR 16.

In the particular embodiment of FIG. 3, if the communication device 18 inputs data packets or cells to DLBR 16 at a rate so great that the token buffer 30 underflows (i.e., so that the number of tokens in the token buffer 30 goes to zero), the join circuitry 34 will drop data packets or cells which are lost. As such, the DLBR 16 outputs data packets conforming to the parameters of the DLBR 16. As discussed below, the DLBR 16 may be of the type in which, when no tokens are available, the join circuitry 34 can include circuitry that labels data cells as "marked" (non-conforming) as low priority data cells. The marked cells are then routed through the network 10 (FIG. 1) on a VC but are more likely to be dropped if congestion is encountered.

In this particular embodiment, the shaper 28 receives regulated traffic and, more specifically, data packets conforming to the parameters of the DLBR 16. The particular design of the shaper 28 can be generalized for use with other regulators 16, such as multiple leaky bucket regulators, as would be understood by one of ordinary skill in the art with the benefit of this disclosure. A regulated data packet is input into the shaper 28 and is stored in a data buffer 42, which in this particular embodiment is a FIFO buffer, of size $B_{DS}$. As in the DLBR 16, if a token is available both in a shaper token buffer 44 and on a $P_S$ line 46, join circuitry 48 permits the regulated data packet to be output from the data buffer 42 and thus from the shaper 28. As described for the DLBR 16, the token buffer 30 in this particular embodiment can be implemented as a counter which is clocked at rate r as provided by processing circuitry 36 of the network node 14. The counter is incremented at the rate r and decremented when a token is used to output a data packet from the shaper 28. In this particular embodiment, the $P_S$ line 46 includes a $P_S$ line token buffer 50 which is capable of holding one token. The $P_S$ line token buffer 38 can also be implemented by a counter which is incremented at the rate $P_S$ and decremented when the token is used to output the data packet from the shaper 28.

The shaper token buffer 44 is capable of holding $B_{TS}$ tokens. Tokens are supplied to the shaper token buffer 30 at the rate r carried over from the DLBR 16 in this particular embodiment, and a token is used when a data packet is output from the shaper 28. In this particular embodiment, the $P_S$ line token buffer 50 receives tokens at the peak rate $P_S$, and the $P_S$ line token buffer 50 is capable of holding a single token which is used when a data packet is output from the shaper 28. As such, the shaper 28 is in general characterized by four parameters: the mean sustainable rate r which in this particular embodiment is carried over from the DLBR 16; $B_{TS}$ is the shaper token buffer size; $B_{DS}$ is the data buffer size which stores traffic cells in contrast to the virtual buffering of tokens; and $P_S$ is the peak shaper rate which in this particular embodiment $P_S <= P$.

The shaper 28 is designed taking into account the parameters for the DLBR 16. These parameters reflect the class or quality of service agreed upon between the user and the network service provider. According to certain principles of the present invention, the network service provider can exploit differences between the traffic classes, such as differences in delay sensitivity, to increase nodal connection capacity by selectively shaping data packets which different delay tolerances. Additionally, the service provider can exploit the differences in traffic classes by designing shapers 28 with different parameters taking into account the different parameters for regulators 16 servicing different traffic classes. In accordance with certain embodiments of the present invention, the traffic shaping system advantageously shapes the traffic using the data buffer 42 at the ingress to the node 14 to reduce the need for buffer memory in the multiplexer 20 (FIG. 2) which can be more expensive. In designing the shaper 28 depending on the parameters of the DLBR 16, two characteristics for the shaper 28 are considered: 1) the shaper 28 is allowed to introduce a delay which cannot exceed the parameter $D_S$ and 2) the shaping process is relatively lossless.

In accordance with certain principles of the present invention, a exemplary framework is developed below which guides in determining parameters for the shaper 28 to increase the nodal connection capacity. The shaping process should be lossless for the conforming stream. The non-conforming cell stream does see losses. For the case of deterministic or lossless multiplexing, the sources can be colluding and thus may synchronize their bursts. In the case of statistical multiplexing, the sources used in the analysis are asynchronous, non-colluding (independent) sources subject to dual leaky bucket regulation. The independent sources together with the allowance of small (for example, on the order of $10^{-9}$) loss probabilities makes statistical multiplexing feasible. As mentioned above, the shaper 28 should be relatively lossless so that losses, if any, occur only at the multiplexer.

The following framework provides design parameters for the shaper 28 such that a given delay tolerance for the connection is satisfied. The exemplary design obtains the admissible region of combinations of sources of various types such that the quality of service requirements of loss and delay are satisfied and the nodal connection-carrying capacity is increased. In this particular framework, the peak rate $P_S$ for the shaper 28 is allowed to be a design variable gives significant increases in capacity in various typical scenarios. The traffic source model of this framework is described with particular reference to the leaky buck regulator. This exemplary framework focuses on a single network node and considers the trading off of bandwidth and buffers and the constraints of regulation and shaping.

As background and preliminary facts, basic quantities and operations are provided in the context of the Dual Leaky Bucket Regulator (r, $B_T$, P). Traffic streams are modeled as fluid flow. In FIG. 3, Q(t) and R(t) are rate processes; Q(t) is offered by the source and R(t) is the conforming process which is passed by the regulator 16. $A_Q(t, t+\tau)$ and $A_R(t, t+\tau)$ denote the total flows during the interval [t, t+τ] for the Q and R rate processes, respectively, where rates and total flows are generally related thus:

$$A_R(t, t+\tau) = \int_t^{t+\tau} R(s)ds. \tag{1}$$

The basic relation describing the conforming process R(t) is $$A_R(t, t+\tau) = \min(A_Q(t, t+\tau), P\tau, z(t)+r\tau) \forall t, \forall \tau > 0. \tag{2}$$

The "min" operation in (2) is performed by the join circuitry 34. In (2) according to this particular embodiment, z(t) represents the token content of the token buffer at time t. The governing equations of z(t) can be shown as:

$$\frac{d}{dt}z(t) = r - R(t), \quad \text{if } 0 < z(t) < B_T \tag{3}$$
$$= [r - R(t)]^+, \quad \text{if } z(t) = 0$$
$$= [r - R(t)]^-, \quad \text{if } z(t) = B_T$$

These equations are used for fluid models with finite buffers. From equations 1–3, it can be shown that $$R(t) = \min(Q(t), P) \quad \text{if } z(t) > 0 \tag{4}$$
$$= \min(Q(t), r) \quad \text{if } z(t) = 0.$$

The Chernoff large deviations approximation is a technique for estimating loss in bufferless multiplexing systems. In this particular embodiment, consider $$P_{loss} = \Pr(U > C), \tag{5}$$

where the total instantaneous load, $$U = \sum_{j=1}^{J} \sum_{k=1}^{K_j} u_{jk},$$

and $\{u_{jk}\}$ are independent, non-negative identically distributed random variables. Here there are J source classes and $K_j$ sources of class j. When C is the nodal bandwidth, $P_{loss}$ is the fraction of time that losses occur.

For purposes of this example framework, assume that the instantaneous loads $u_{jk}$ have moment generating functions:

$$M_j(s) = E[e^{su_{jk}}] \ (j=1,2,\ldots, J). \tag{6}$$

and that the stability condition $$\sum_j K_j E(u_{jk}) < C$$

and that $$\lim_{s \to \infty} \sum_j K_j M_j'(s) / M_j(s) > C,$$

otherwise there is no loss.

In this particular example, Chernoff's bound is $$\log P_{loss} \leq -F(s^*), \tag{7}$$

where $$F(s) = sC - \sum_j K_j \log M_j(s) \tag{8}$$

F(s) in this particular embodiment is concave with a maximum at s*(s*>0), which is obtained by solving F'(s)=0. Also, if $K_j = \gamma_j C$ with $\gamma_j = O(1)$ and $C \to \infty$, then $$\log P_{loss} = -F(s^*)[1+O(\log C/C)]. \tag{9}$$

Hence, the large deviations approximation is $P_{loss} \sim \exp(-F(s^*))$. Elementary techniques, such as bisections, are effective for calculating s*.

The above approximation is used for the qualitative treatment in the example framework, but these numerical procedures are augmented it by a lower-order refinement described in V. V. Petrov, "On the Probabilities of Large Deviations for Sums of Independent Random Variables," Theory Probab. Applicat. 10, 1965, pp. 287–298. For the same asymptotic scaling which gives (9), $$P_{loss} = \frac{\exp\{-F(s^*)\}}{s^* \sigma(s^*) \sqrt{2\pi}} [1 + o(1)] \tag{10}$$

where $\sigma^2(s) = \partial^2 \log E(e^{sU})/\partial s^2$. More specifically, $$\sigma^2(s) = \sum_{j=1}^{J} K_j \left[ \frac{M_j''(s)}{M_j(s)} - \left\{ \frac{M_j'(s)}{M_j(s)} \right\}^2 \right]. \tag{11}$$

To improve the Chernoff loss estimate, consider the Chernoff approximation $P_{loss} \sim \exp(-F(s^*))$ and distributions of independent, nonnegative random variables $\{u_{jk}\}$, which possess moment generating functions and satisfy the following constraints: for k=1, 2, . . . , $K_j$ and j=1, 2, . . . , J $$u_{jk} \leq \bar{u}_j \tag{12}$$

$$E(u_{jk}) \leq \rho_j. \tag{13}$$

In this particular embodiment, assume that $$\sum_{j=1}^{J} K_j \rho_j < C,$$

and that $$\lim_{s\to\infty} \sum_{j=1}^{J} K_j M'_j(s) / M_j(s) > C,$$

as otherwise there should be no loss. The result is for any independent random variables $u_{jk}$ with distributions $V_j(x)$ which satisfy the constraints (12) and (13), there exist on-off random variables $\hat{u}_{jk}$, with distributions $\hat{V}_j(x)$, which take values 0 and $\bar{u}_j$ only, and $E(\hat{u}_{jk})=\rho_j$, i.e., $$\Pr(\hat{u}_{jk}=\bar{u}_j)=1-(\Pr(\hat{u}_{jk}=0)=\rho_j/\bar{u}_j, \qquad (14)$$

for which the Chernoff approximation to the loss probability is at least as great, i.e., $F(s^*) \geq \hat{F}(\hat{s}^*)$, with equality if $V_j \equiv \hat{V}_j (j=1,2,\ldots,J)$.

In order to show a property which is used to obtain the conditions for lossless shaping for this example framework, consider FIG. 3 which depicts the coupled system. As shown in FIG. 3, z(t), x(t) and y(t) respectively denote the contents of the token buffer 30 in the regulator 16, the data buffer 42 in the shaper 28 and the token buffer of the shaper 44. Define $$w(t) \stackrel{\Delta}{=} \{B_T - z(t)\} - [x(t) + \{B_{TS} - y(t)\}]. \qquad (15)$$

For this particular example, let the data buffer be sufficiently large so that no overflows occur there. In this step, the nonnegativity of w(t) is established.

The governing equations are:

$$\frac{d}{dt}z(t) = r - R(t) \quad \text{if } z(t) < B_T \qquad (16)$$
$$= [r - R(t)]^- \quad \text{if } z(t) = B_T$$

$$\frac{d}{dt}x(t) = R(t) - S(t) \qquad (17)$$

$$\frac{d}{dt}y(t) = r - S(t) \quad \text{if } y(t) < B_{TS} \qquad (18)$$
$$= [r - S(t)]^- \quad \text{if } y(t) = B_{TS}.$$

To categorize the behavior of w(t) we consider four regimes:

Regime (i): $z(t)<B_T$ and $y(t)<B_{TS}$
Regime (ii): $z(t)=B_T$ and $y(t)=B_{TS}$
Regime (iii): $z(t)=B_T$ and $y(t)<B_{TS}$
Regime (iv): $z(t)<B_T$ and $y(t)=B_{TS}$.
From (16)–(18), the following is obtained:

$$\frac{d}{dt}w(t) = -\frac{d}{dt}[z(t) + x(t) - y(t)] = 0, \text{ for Regimes (i) and (ii)} \qquad (19)$$

$$\geq 0, \text{ for Regime (iii)} \qquad (20)$$

$$\leq 0, \text{ for Regime (iv)}. \qquad (21)$$

Considering the last relation of the regime (iv), $R(t)=S(t) \leq r$, otherwise the shaper's token buffer 44 would not be full. Since, in general, $$y(t) = B_{TS} \Rightarrow x(t) = 0, \qquad (22)$$

it also follows that dx/dt=0. Finally, since $y(t)=B_{TS}$ in Regime (iv), it follows that dy/dt=0. Hence, in Regime (iv), $$\frac{d}{dt}[z(t) + x(t) - y(t)] = \frac{d}{dt}z(t) = r - R(t) \geq 0 \qquad (23)$$

and, consequently, $dw/dt \leq 0$.

The above observations lead to the proposition that if at any time t', $w(t') \geq 0$ then for all time t>t', $w(t) \geq 0$.

The shaper 43 is under the control of the network management system as processing circuitry 36, and initial conditions, i.e., conditions at connection admission can be set. For discussion purposes, assume that at connection admission time, say t=0, $w(0) \geq 0$. This can be obtained, for instance, by having the data buffer 42 empty, x(0)=0, and the token buffer 44 full, $y(0)=B_{TS}$. It then follows from the above proposition that:

$$w(t) \geq 0 \text{ for all } t \geq 0. \qquad (24)$$

Consequently, the following, which will be needed later, is true.

For $t \geq 0$, if $x(t)=0$ then $\{B_{TS}-y(t)\} \leq \{B_T-z(t)\}$. (25)

An estimate of how large x(t) can be in the example framework of the system of FIG. 3, where the Dual Leaky Bucket Regulator's parameters (r, $B_T$, P) are provided by agreement between user and provider in this example, and $P_s$ is given in this particular embodiment, where $r<P_s \leq P$. The maximum of x(t) can assist in determining the size of the data buffer 42 in the shaper 28, $B_{DS}$ for lossless shaping.

Let $t_0$ be the start of a busy period of the shaper's data buffer 42, i.e., $x(t_0)=0$ and $x(t_0+)>0$. Let $A(t, t+\tau)$ denote the total flow of the rate process R in the interval $[t, t+\tau]$. In this example, a bound on $A(t, t+\tau)$ for all t is $E(\tau)$:

$$A(t_0, t_0+\tau) \leq E(\tau) \stackrel{\Delta}{=} \min(P\tau, z(t_0)+r\tau). \qquad (26)$$

Figure 4A:
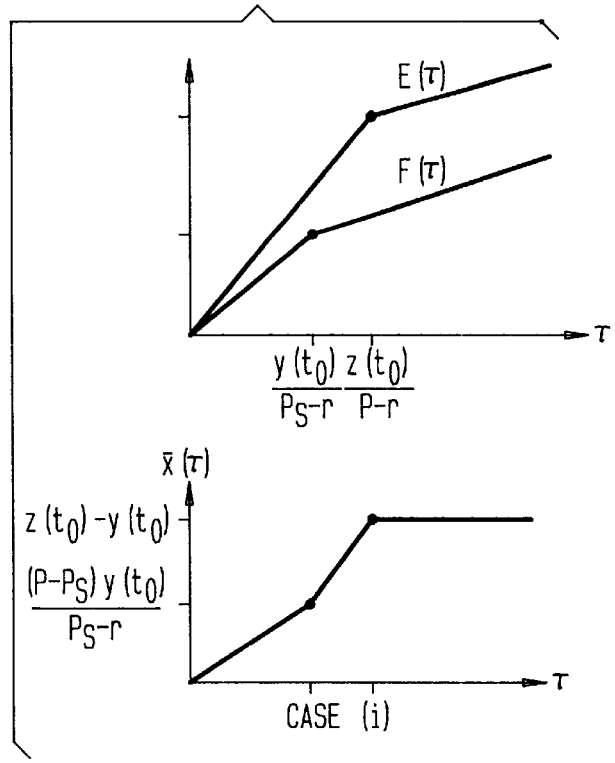
FIG. 4 shows graphs relating to the data buffer content in the traffic shaper system for different cases.
Figure 4B:
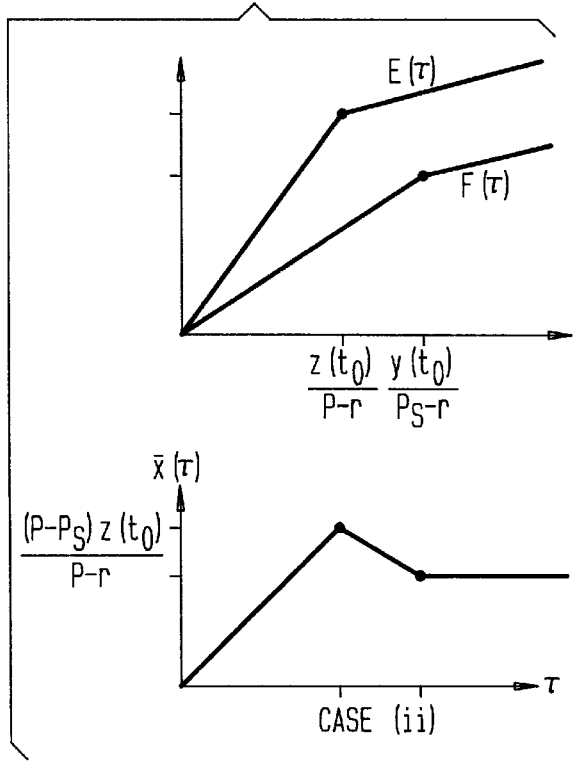

Two cases are considered, depending upon whether the shaper's token framework buffer 42 has the potential of emptying before or after the regulator's token buffer 30 as shown in the graphs of FIG. 4.

$$\text{Case (i): } \frac{y(t_0)}{P_S-r} \leq \frac{z(t_0)}{P-r} \qquad (27)$$

$$\text{Case (ii): } \frac{y(t_0)}{P_S-r} > \frac{z(t_0)}{P-r} \qquad (28)$$

In this example framework, let $F(\tau)$ denote a lower bound on the total flow of the shaped rate process S(t) which leaves the shaper's data buffer 42 during the interval $[t_0, t_0+\tau]$. It is assumed here that this interval is contained in the busy period of the data buffer 42. Clearly, $$x(\tau) \leq \bar{x}(\tau) \stackrel{\Delta}{=} E(\tau) - F(\tau) \qquad (29)$$

In Case (i), $$F(\tau) = P_S\tau \text{ for } 0 \le \tau \le y(t_0)/(P_s - r) \quad (30)$$

$$= \frac{y(t_0)P_S}{P_S - r} + r\tau \ y(t_0)/(P_S - r) < \tau.$$

Since $x(t_0)=0$, and noting that a peak buffer content is reached during the busy period, $$x(\tau) \le z(t_0) - y(t_0) \text{ for all } \tau. \quad (31)$$

By the final result of the analysis stated in (25), $$z(t_0) - y(t_0) \le B_T - B_{TS}. \quad (32)$$

Hence, for Case (i) in this example framework, a bound on the content of shaper's data buffer 42 is, $$x(\tau) < B_T - B_{TS}. \quad (33)$$

Proceeding to Case (ii), $$x(\tau) \le \frac{(P - P_S)z(t_0)}{(P - r)} \text{ for all } \tau, \quad (34)$$

again by virtue of $x(t_0)=0$ and that a peak buffer content is attained during the busy period.

Figure 5:
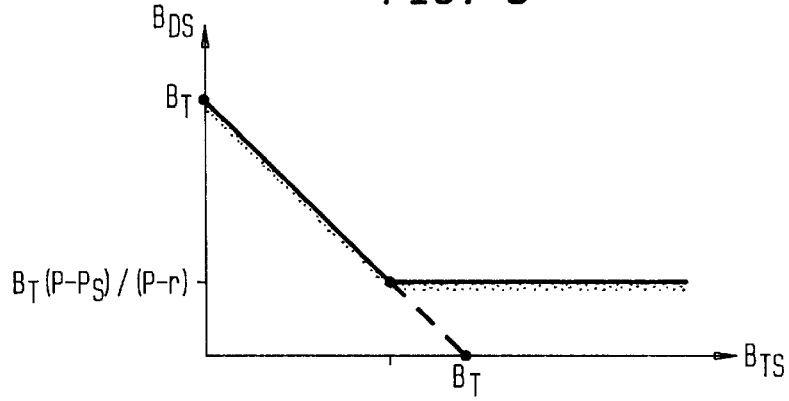
FIG. 5 is a graph showing conditions that result in lossless shaping.

Thus, sufficient conditions for lossless shaping are:

$$B_{DS} \ge B_T - B_{TS}, \text{ and } B_{DS} \ge \frac{B_T(P - P_S)}{P - r}, \quad (35)$$

which respectively arise from Case (i) and Case (ii) as shown in the graph of FIG. 5.

In determining parameters to satisfy a delay requirement, let $D_S$ denote the prespecified bound on the delay introduced by the shaper 28. The delay in the shaper 28 can be as high as $B_{DS}/r$. Hence, the requirement on the maximum delay implies the constraint $$B_{DS}/r \le D_S. \quad (36)$$

The system of inequalities (35)-(36) constitute a set of constraints for the selection of the parameters $B_{TS}$, $B_{DS}$ and $P_S$ of the shaper 42. All else being equal, smaller values of $B_{TS}$ and $P_S$ lead to higher connection-carrying capacities at network nodes. This consideration is the motivation for the solution to the above constraints. Thus, given (r, $B_T$, P) and the delay bound $D_S$, the selection of ($B_{DS}$, $B_{TS}$, $P_S$), which satisfies the delay bound, the constraints due to lossless shaping and gives smaller values of $B_{TS}$ and $P_S$, is obtained by replacing inequalities by equalities, $$B_{DS}=rD_S, \ B_{TS}=B_T-rD_S, \ P_S=P-rD_S(P-r)/B_T. \quad (37)$$

Figure 6:
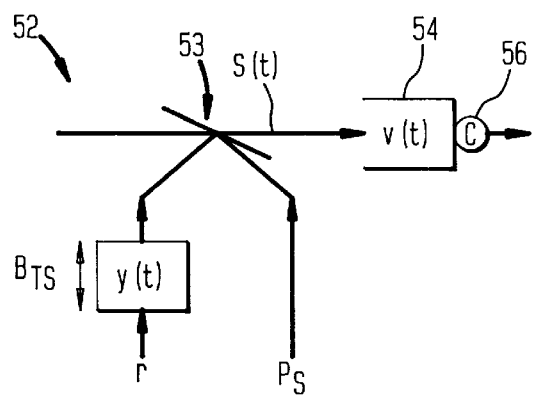
FIG. 6 shows a block diagram of a traffic shaper system coupled to a single source.

For discussion purposes, FIG. 6 shows a single source system 52 including shaper 53 in which a single shaped traffic stream S(t) feeds a buffer 54 of infinite capacity, which is serviced by a trunk 56 of capacity, i.e., bandwidth, c(c>r). The physical multiplexing system is different, which is why the above construct is a "virtual" system. The content of the buffer 54 is denoted by v(t). To derive a simple expression for the supremum of the buffer content in this particular example, the shaped stream S(t) is such that the total flow in any interval [t, t+τ], $A_S(t, t+\tau)$, is bounded thus $$A_S(t, \ t+\tau) \le \min(P_S\tau, \ y(t)+r\tau) \ \forall t, \ \forall \tau > 0. \quad (38)$$

The presence of the token buffer content y(t) on the right is on account of the coupling of the shaper 53 with the single source system 52, which is necessary to get the following upper bound on the buffer content v(t) in this particular example. The presence of other components, such as the shaper's data buffer, imply additional constraints on v(t), which are not used here.

For all t:

$$v(t) \le \frac{(P_S - c)B_{TS}}{(P_S - r)} \triangleq b. \quad (39)$$

Figure 7:
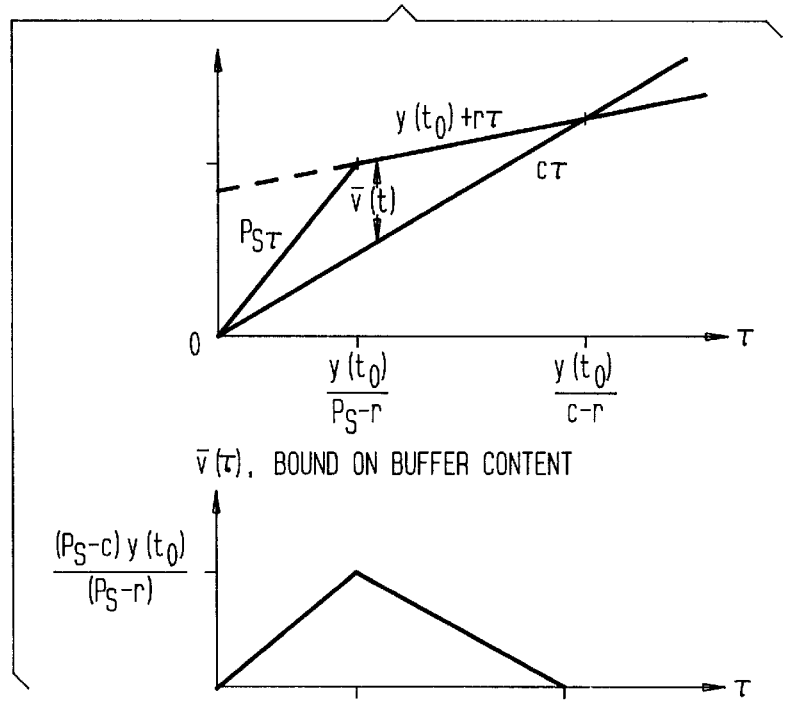
FIG. 7 are graphs showing the buffer content during busy operations.

As such, the supremum of v(t) occurs during a busy period of the buffer. Let $t_0$ correspond to the onset of a busy period, i.e., $v(t_0)=0$ and $v(t_0+)>0$. As shown in FIG. 7, during the busy period the total flow into the buffer during the interval $[t_0, t_0+\tau]$ is, from (38), bounded by:

$$P_S\tau \quad (40)$$

$0 \le \tau \le y(t_0)/(P_S-r)$ $y(t_0)+r\tau$ $y(t_0)/(P_S-r) \le \tau.$

On the other hand, since by assumption, the interval $[t_0, t_0+\tau]$ is contained in the busy period, the total flow out of the buffer is at least $c\tau$. The difference, $\bar{v}(\tau)$, is a bound on the buffer content during the buffer's busy period. Hence, for $\tau \ge 0$, $$\bar{v}(\tau) \le \frac{(P_S - c)y(t_0)}{(P_S - r)} \le \frac{(P_S - c)B_{TS}}{(P_S - r)}.$$

As indicated in (39), the bound on the buffer content is given by b, which may conveniently be viewed as a function of the variable c, i.e., b=b(c). This function is linear, decreasing.

For multiplexing several K-shaped traffic streams by a FIFO buffer of capacity B, which is serviced by a trunk of capacity, i.e., bandwidth, C. The characteristics of the single source system 52 are used to obtain the capacity of the lossless multiplexer, i.e., the maximum number of shaped streams, $K_{max}$ which may be admitted without any overflow of the multiplexer buffer occurring.

The total flow from the $k^{th}$ shaped stream $S_k$(t) in any interval [t, t+τ], $A_{S_k}(t, t+\tau)$, is bounded as in (38). The aggregate flow in the interval from the superposition of K-shaped streams is bounded by $A_{agg}$ (t, t+τ), where $$A_{agg}(t, t+\tau) = \sum_{k=1}^{K} A_{S_k}(t, t+\tau) \quad (41)$$

Hence, $$A_{agg}(t, \ t+\tau) \le K \min(P_S\tau, \ B_{TS}+r\tau) = \min(KP_S\tau, \ KB_{TS}+Kr\tau). \quad (42)$$

Since the characterization of the aggregate flow is in terms of a single stream with parameters (Kr, $KB_{TS}$, $KP_S$), the same reasoning that was used in (39) can be used to establish a bound on the content of the multiplexing buffer, X(t). Assuming initially that the capacity of the multiplexing buffer is infinite, this reasoning gives $$X(t) \leq \frac{(KP_S - C)B_{TS}}{(P_S - r)}, \quad (43)$$

for all t. Hence, if $$\frac{(KP_S - C)B_{TS}}{(P_S - r)} \leq B, \quad (44)$$

then there is no loss in the multiplexer with a buffer of size B.

Using the framework of the above single source system 52 (FIG. 6), $K_{max} = \lfloor C/e_0 \rfloor = \lfloor B/b_0 \rfloor$, where $(e_0, b_0)$ are solutions of the following pair of equations in (c, b), $$\frac{(P_S - c)B_{TS}}{(P_S - r)} = b \quad (45\text{i})$$

$$B/b = C/c \quad (45\text{ii})$$

Thus, $e_0$ and $b_0$ may appropriately be called the effective bandwidth and effective buffer, respectively, for a single stream.

In this example framework, the characterization of the capacity of the lossless multiplexing system $K_{max}$ is the admissible number of shaped streams, which are extremal on-off and, furthermore, have coincident on periods. Note, if $B_{TS}$ or $P_S$ are smaller with all other parameters held fixed, then $e_0$ and $b_0$ are smaller and, consequently, the capacity $K_{max}$ is greater.

Above, an allocation of the two resources for each connection was made which increased the capacity of the network node. A key requirement so far has been that no losses occur in either the shaper 28 (FIG. 3) or the multiplexer 20 (FIG. 3). This requirement is relaxed now where small losses up to a specified amount L are allowed in the multiplexer. Furthermore, an assumption is made that the connections behave as independent statistical traffic sources, which disallows collusive behavior. The combination of the two features allows statistical multiplexing. The result of statistical multiplexing is increased capacity.

The key to statistical multiplexing is the observation that, (i) even though each connection is allocated resources, say bandwidth $e_0$, such allocations are not utilized all the time, and, hence, (ii) the probability that several connections will require their resource allocations simultaneously decays rapidly with the number of such connections. Relying on the Chernoff bound and asymptotic, large deviations approximation to estimate the loss probability, $$P_{loss} = \Pr(U > C), \quad (46)$$

where the total bandwidth load $$U = \sum_{k=1}^{K} u_k,$$

and $u_k$ is the instantaneous random demand on bandwidth from connection k. The random variables $\{u_k\}$ are independent, identically distributed. Note that $$0 \leq u_k \leq e_0 \text{ and } E(u_k) \leq r \ (1 \leq k \leq K). \quad (47)$$

Using the result in (14), which gives the extremal distribution of independent, identically distributed random variables which satisfy (47) and improve the Chernoff approximation to the loss probability. As such, the Chernoff approximation to the loss probability $P_{loss}$ in (46) is improved by independent, on-off random variables $\hat{u}_k$ which only take values 0 and $e_0$, and $E(\hat{u}_k) = r$, i.e., $$\Pr(\hat{u}_k = e_0) = 1 - \Pr(\hat{u}_k = 0) = \omega, \quad (48)$$

where $\omega = r/e_0$.

Thus far only one resource, bandwidth, has been examined. When the worst-case behavior of bandwidth demand as expressed in (48) is taken into account in capacity calculations, then the constraints imposed by the other resource, buffers, are also accounted for. Note, buffers are utilized only when the bandwidth demand is positive. Specifically, when bandwidth demand is 0, then the buffer space demand is 0, and when the bandwidth demand is at its peak value of $e_0$, then the buffer demand, may be bounded by $b_0$ (FIG. 7). With this bound, the bandwidth and buffer demand processes for each connection are mutually synchronized, on-off, and the loss probability expressed in (46) bounds the probability that either bandwidth demand exceeds C or buffer space demand exceeds B in this particular embodiment.

Since the extremal distribution for the total bandwidth demand U from K connections is binomial, it is straightforward to obtain the extremal Chernoff asymptotic approximation for $P_{loss}$. Thus, $$P_{loss} \sim \frac{e^{-F(s^*)}}{s^* \sigma(s^*) \sqrt{2\pi}}, \quad (49)$$

where $$a = \frac{C}{K} \cdot \frac{1}{e_0}, \quad s^* = \frac{1}{e_0} \log\left[\frac{a}{1-a} \cdot \frac{1-\omega}{\omega}\right],$$

$$F(s^*) = K\left[a \log\left(\frac{a}{\omega}\right) + (1-a)\log\left(\frac{1-a}{1-\omega}\right)\right], \quad (50)$$

and $$\sigma^2(s) = K\omega(1-\omega)e_0^2 \exp(se_0)/\{1 - \omega + \omega\exp(se_0)\}^2. \quad (51)$$

The capacity $K_{max}$ is the value of K for which $$\frac{e^{-F(s^*)}}{s^* \sigma(s^*) \sqrt{2\pi}} = L. \quad (52)$$

As such, the quality of service requirement $P_{loss} \leq L$ is satisfied for all $K \leq K_{max}$. The effective bandwidth in the context of statistical multiplexing is denoted by e, where $eK_{max} = C$. Clearly $e \leq e_0$, the effective bandwidth for lossless multiplexing.

It requires simple calculus on (50) to establish that $F(s^*)$ is monotonic increasing with decreasing $e_0$, for fixed r. Together with the prior observation that $e_0$ is monotonic decreasing with decreasing $B_{TS}$ and decreasing $P_S$, this shows that the design of the shaper 28 (FIG. 3) which increases capacity uses the smaller values of $B_{TS}$ and $P_S$ consistent with lossless behavior at the shaper 28 (FIG. 3), and these values are given in (37).

To extend to the case of multiple classes of connections in the areas of lossless and statistical multiplexing, the regulators are specified by $(r^{(j)}, B_T^{(j)}, P^{(j)})$, the shaping filters by $(r^{(j)}, B_{TS}^{(j)}, B_{DS}^{(j)}, P_S^{(j)})$ and the number of connections by $K_j$ for class j. The effective bandwidth and effective buffer of class j sources for lossless multiplexing are obtained as described above and denoted by $e_0^{(j)}$ and $b_0^{(j)}$, respectively. Thus, the sources $K=(K_1, K_2, \ldots, K_j)$ allow lossless multiplexing if $$\sum_{j=1}^{J} K_j e_0^{(j)} \leq C. \tag{53}$$

In showing this, note that from (53) and (45) that $$\sum_{j=1}^{J} K_j b_0^{(j)} \leq B. \tag{54}$$

Considering a virtual partition of the bandwidth into components $\{C_j\}$ and the buffer into components $\{B_j\}$, such that $$C_j \triangleq K_j e_0^{(j)} \text{ and } B_j \triangleq K_j b_0^{(j)}, \text{ with } (C_j, B_j)$$

dedicated to class j sources, note that $$\frac{B_j}{B} = \frac{C_j}{C}, \tag{55}$$

so that the properties of lossless behavior described above carry over here to each virtually partitioned system dedicated to all sources of a particular class.

Let $A_0$ denote the set obtained from the above proposition of admissible sources for lossless multiplexing, i.e., $$A_0 = \left\{ K \left| \sum_{j=1}^{J} K_j e_0^{(j)} \leq C \right. \right\}.$$

Proceeding to statistical multiplexing, the loss probability, $P_{loss}$ is given by the expression in (46), where now $$U = \sum_{j=1}^{J} \sum_{k=1}^{K_j} u_{jk}$$

and $u_{jk}$ is the instantaneous demand on the bandwidth from connection k of class j. The Chernoff asymptotic approximation is used to estimate $P_{loss}$. The Chernoff asymptotic approximation to the loss probability $P_{loss}$ increases with independent on-off random variables $\hat{u}_{jk}$, which take values 0 and $e_0^{(j)}$ and $E(\hat{u}_{jk}) = r^{(j)}$, i.e., $$\Pr(\hat{u}_{jk} = e_0^{(j)}) = 1 - \Pr(\hat{u}_{jk} = 0) = \omega^{(j)}. \tag{56}$$

where $\omega^{(j)} = r^{(j)}/e_0^{(j)}$. Assume that $$\sum_j K_j r^{(j)} < C \text{ and } \sum_j K_j e_0^{(j)} > C.$$

The worst-case Chernoff asymptotic approximation for $P_{loss}$ with statistical multiplexing and heterogeneous sources is $$P_{loss} \sim \frac{e^{-F(s^*)}}{s^* \sigma(s^*) \sqrt{2\pi}}, \tag{57}$$

where $s^*$ is the unique positive real solution to the equation $$\sum_j \frac{K_j \omega^{(j)} e_0^{(j)} \exp(s e_0^{(j)})}{1 - \omega^{(j)} + \omega^{(j)} \exp(s e_0^{(j)})} = C, \tag{58}$$

$$F(s) = sC - \sum_j K_j \log\{1 - \omega^{(j)} + \omega^{(j)} \exp(s e_0^{(j)})\}, \tag{59}$$

and $$\sigma^2(s) = \sum_j \frac{K_j \omega^{(j)} (1 - \omega^{(j)}) (e_0^{(j)})^2 \exp(s e_0^{(j)})}{\{1 - \omega^{(j)} + \omega^{(j)} \exp(s e_0^{(j)})\}^2}. \tag{60}$$

Let $A_L$ denote the set of connection $K=(K_1, \ldots, K_j)$ such that $P_{loss}$ as estimated by the expression in (57) does not exceed L. For a wide variety of conditions the boundary $\partial A_L$ is closely approximated by an appropriately chosen linear hyperplane, which bounds $A_L$ in this particular embodiment. An upper bound on $A_L$ can be given by $\{K: \Sigma K_j e_j \leq C\}$, where $e_j$ is obtained by considering class j in isolation. When $\partial A_L$ is close to being linear, this approximation is close to the estimate.

Figure 8:
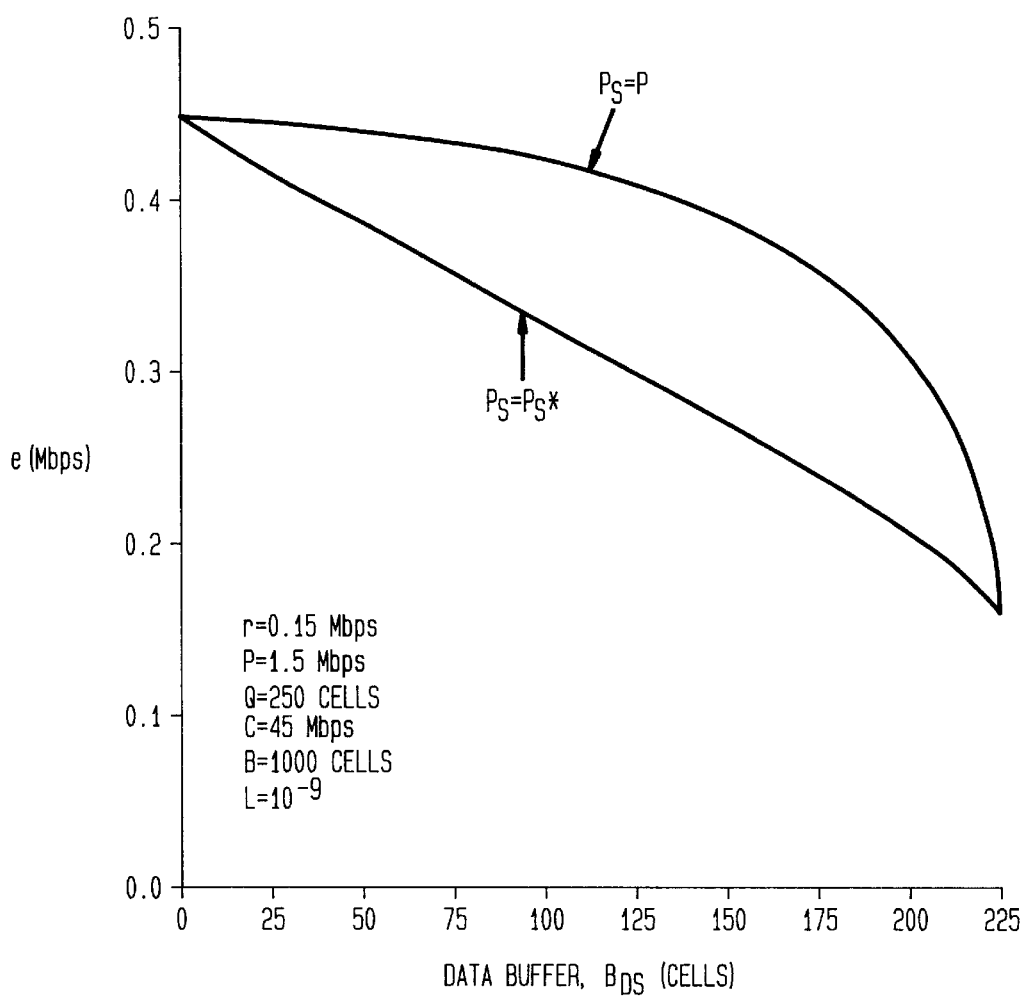
FIG. 8 is a graph showing effective bandwidth versus the size of the data buffer for a traffic shaping system according to the principles of the present invention.
Figure 9:
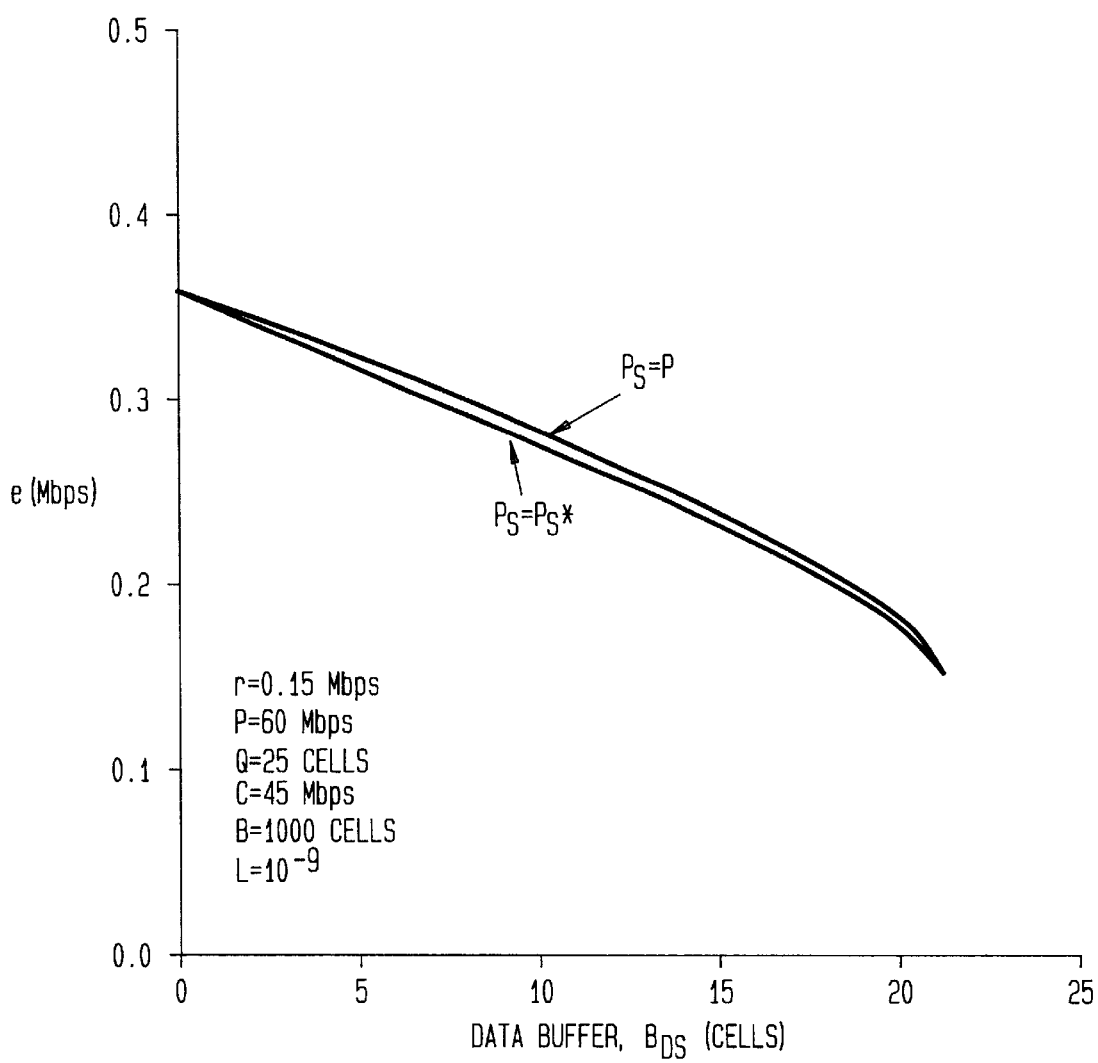
FIG. 9 is a graph showing effective bandwidth versus the size of the data buffer for different operating parameters for a traffic shaping system according to the principles of the present invention.

FIGS. 8 and 9 illustrate the results of the shaper design and the role of shaping in increasing the network capacity. FIGS. 8 and 9 examine the effect of traffic shaping and the associated traffic delay on the effective bandwidth of the traffic sources, and demonstrate the advantage of choosing the shaper's parameters in accordance with embodiments of the example framework. FIG. 8 depicts the traffic shaping system of FIG. 3 where a single class of sources is subject to dual leaky bucket regulation, then shaped and multiplexed on a link with transmission capacity of 45 Mbps and (FIFO) buffer size of 1000 cells. The parameters of the dual leaky bucket regulator are: mean rate r=0.15 Mbps, peak rate P=1.5 Mbps and burst size Q=250 cells, where $Q=B_T P/(P-r)$. The size of the data buffer, $B_{DS}$, of the shaper 28 (FIG. 3)(and hence its delay) is varied from 0 to 225 cells, and the effective bandwidth of the shaped traffic when the cell loss probability at the link is not greater than $10^{-9}$ is plotted for the case when the peak rate of the shaper 28 (FIG. 3), $P_S$, is equal to the peak rate of the leaky bucket regulator 16 (FIG. 3), P, and for the case when $P_S$ is set to the value referred to as $P_S^*$ in FIGS. 8 and 9. Observe first that increasing the data buffer, BDS, from 0 to 225 cells (delay from 0 to 636 msec) has the effect of reducing the effective bandwidth from 0.45 Mbps to the source mean rate value of 0.15 Mbps. Second, the changing of the peak rate of the shaper 28 (FIG. 3) results in an appreciable reduction in the effective bandwidth. FIG. 9 is similar to FIG. 8 except that the parameters of the regulator are r=0.15 Mbps, P=6.0 Mbps and Q=25 cells. In this case, varying the peak rate $P_S$ of the shaper 28 (FIG. 3) does not reduce the effective bandwidth as significantly as in FIG. 8.

Figure 10:
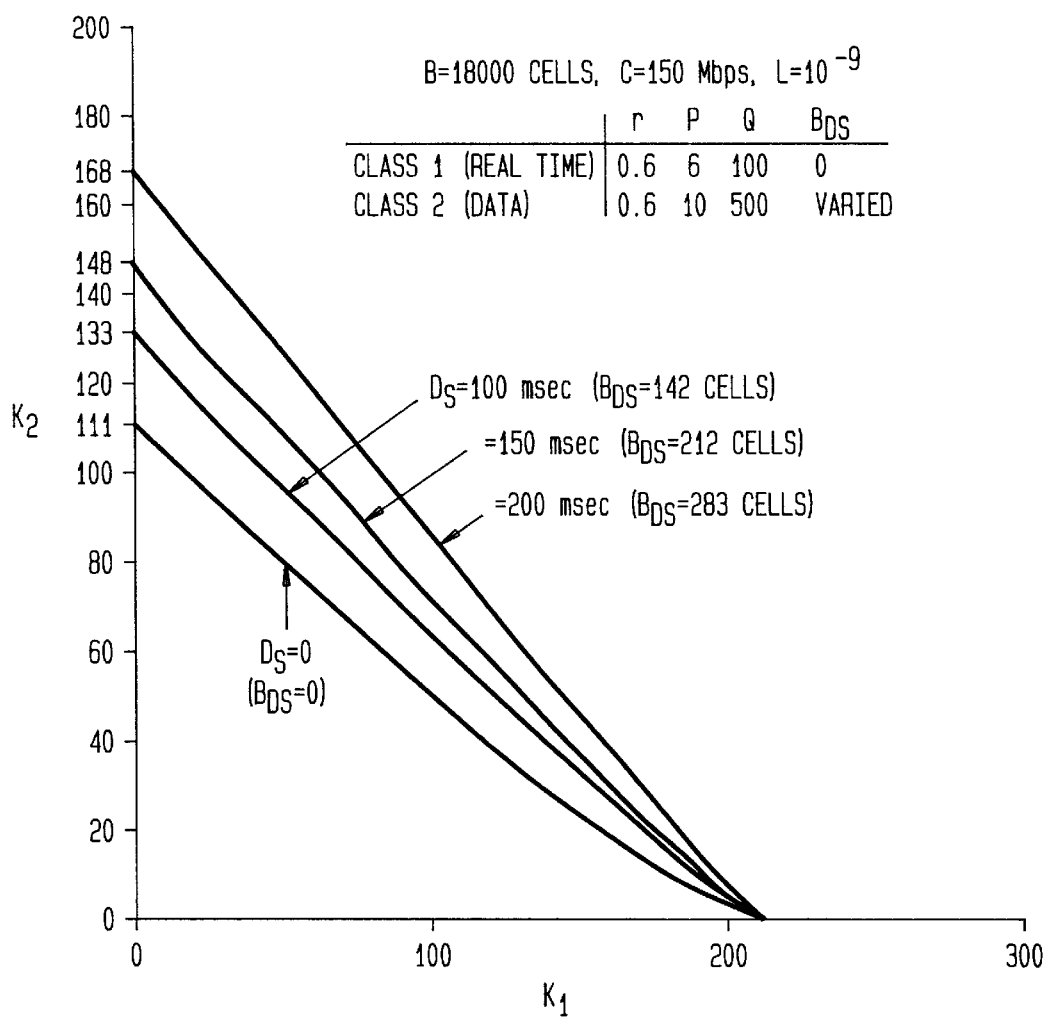
FIG. 10 is a graph showing the admissible region for the multiplexing of a real-time source class and a non-real-time source class showing the effects of shaping the non-real-time sources.
Figure 11:
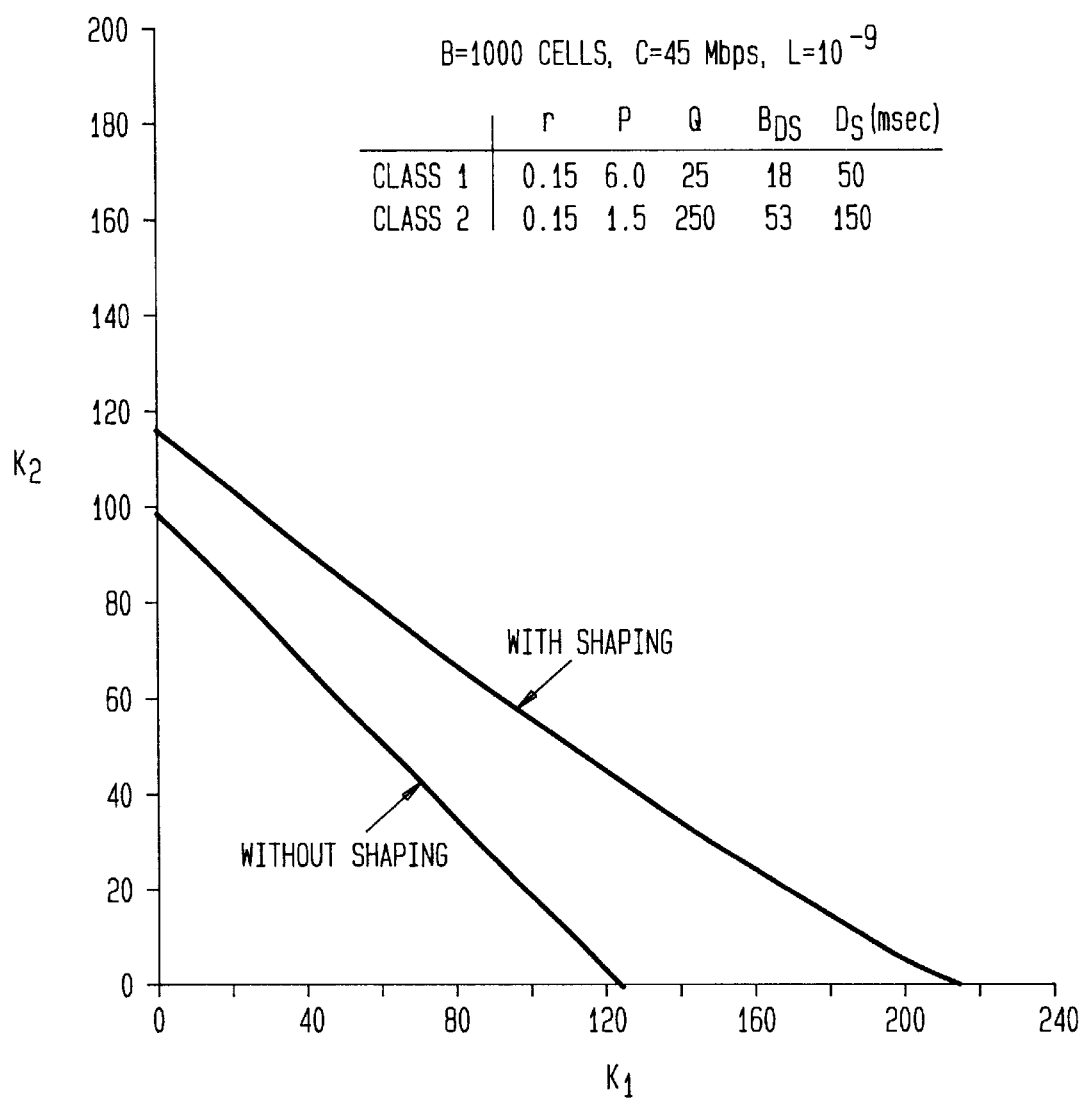
FIG. 11 is a graph showing the admissible region for the multiplexing of two source classes showing the effect of shaping the two classes.

FIG. 10 shows the multiplexing of two classes of sources in the configuration shown in FIG. 2; class 1 sources are real-time (delay-sensitive), while class 2 sources are non-real time (delay insensitive). The multiplexer parameters are B=18000 cells and C=150 Mbps, and therefore introduces a delay of 51 msec, which may be considered to be the delay tolerance of class 1. Since class 2 tolerates greater delay, its traffic is shaped to reduce its effective bandwidth. The boundary of the admissible region of class 1 and class 2, sources is plotted for different values of shaping delay, $D_S$, for class 2, ranging from zero to 200 msec. By shaping class 2, the capacity of the system 14 (FIG. 2) significantly increases while meeting the delay constraints of both classes. FIG. 11 shows the admissible region plotted for the two class of sources considered separately in FIGS. 8 and 9. Each class is shaped according to a delay constraint and the boundary of the admissible region with and without shaping are plotted, illustrating the significant gain in capacity due to shaping.

Thus, according to certain principles and embodiments of the present invention, a framework is provided for integrating shaping on a per-connection basis with FIFO statistical multiplexing. It is shown that differences in delay tolerances between different traffic classes may be exploited by shaping the less delay sensitive traffic. Shaping is shown to increase the nodal connection-carrying capacity, with the beneficial increase often quite substantial when a shaper design according to generalized versions of the example framework is utilized.

Alternative embodiments of the framework in accordance with the principles of the present invention are available. For example, small cell losses could be allowed in the shaper 28 (FIG. 3), so that the total loss has components arising from the shaper and the statistical multiplexer. Also, the data buffers from various shapers are designed to share a common memory pool. Both features will have the effect of increasing connection-carrying capacity for given total memory. Furthermore, the framework according to the principles of the present invention extends readily to switches where the buffering is on a per-connection basis and the scheduling is weighted round-robin.

Figure 12:
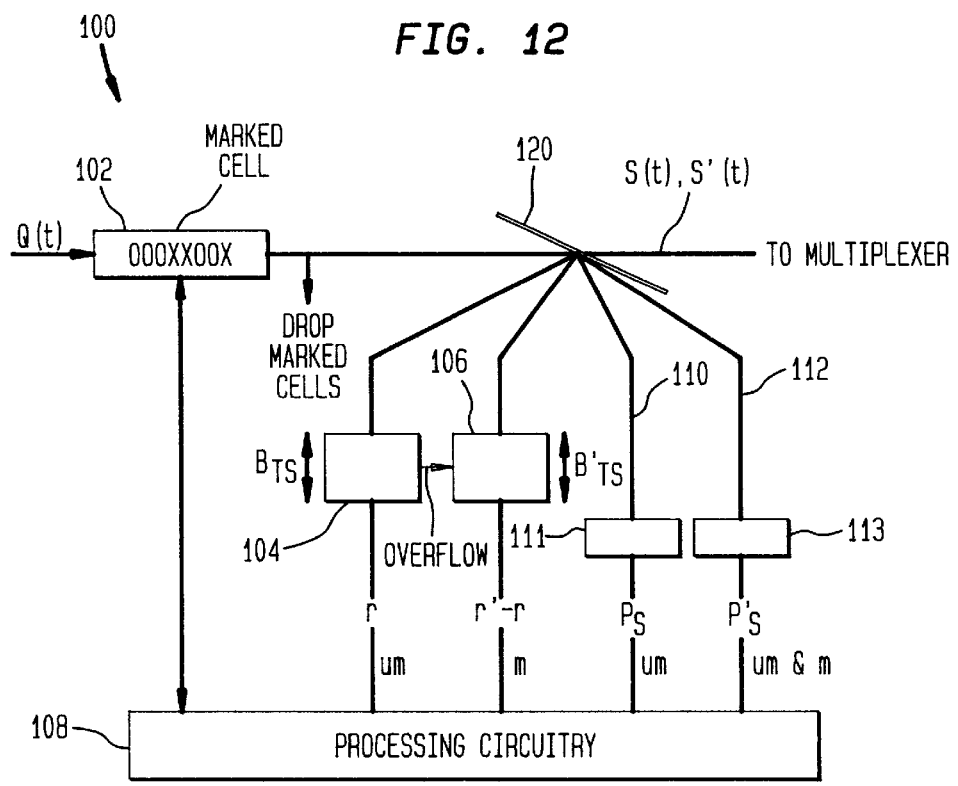
FIG. 12 shows an integrated regulator and shaper according to certain principles of the present invention.

In accordance with these and other principles and embodiments of the present invention, FIG. 12 shows an integrated regulator and shaper 100 used at the ingress to a network node 14 (FIG. 1) where the regulator 16 (FIG. 1) and shaper 28 (FIG. 1) are shown. The integrated regulator/shaper 100 concurrently regulates and shapes data cells entering the regulator and shaper 100. The regulator/shaper 100 of FIG. 12 regulates and shapes separately 1) the conforming (unmarked) cells and 2) optionally the aggregate stream of conforming and non-conforming (marked) cells admitted into the network 10. The integrated regulator/shaper 100 includes a data buffer 102 where, using the previous parameters discussed, the size of the buffer 102>=$B_{DS}$. The regulator/shaper 100 includes a unmarked token buffer 104 which is capable of is holding $B_{TS}$ tokens as described for the shaper 28. The unmarked token buffer 104 receives tokens at a rate r which is the mean rate for unmarked cells.

In this particular embodiment, if the token buffer 104 is full, overflow tokens can be directed to the marked token buffer 106. The marked token buffer can hold $B'_{TS}$ tokens, and tokens are fed to the marked token buffer at a rate r'–r, where r' is the mean sustainable rate for the aggregate of unmarked and marked data cells. If the marked token buffer 106 is full, then overflow tokens are dropped. The token buffers 104 and 106 can be implemented with counters which are incremented at a rate r and r'–r respectively from processing circuitry 108 and which are decremented when their respective tokens are used to output a data cell from the regulator/shaper 100.

The regulator/shaper 100 receives an available token on unmarked token line 110 from an unmarked token buffer 111 which receives tokens at a rate, $P_S$, corresponding to the peak rate for unmarked cells. The regulator/shaper 100 also receives tokens from an aggregate token line 112 from an aggregate token buffer 113 which receives tokens at a rate, $P'_S$, corresponding to the peak rate of the aggregate (marked and unmarked) cells. In this particular embodiment, the unmarked token buffer 111 is capable of holding one token, and the aggregate token buffer 113 is capable of holding one token. The token buffers 111 and 113 can be implemented by counters which are incremented at the rates of $P_S$ and $P_S'$ respectively and which are decremented when their respective tokens are used to output a data cell from the regulator/shaper 100. As such, the regulator/shaper 100 is in general characterized by various parameters: the mean sustainable rate r for unmarked cells; the mean sustainable rate r' for the aggregate stream of cells whose default value is r; $B_{TS}$ is the unmarked token buffer size; $B'_{TS}$ is the unmarked token buffer size; $B_D$ is the data buffer size which in this particular embodiment >=$B_{DS}$ for the shaper 28 (FIG. 3); $P_S$ is the peak rate for unmarked cells; and $P'_S$ is the peak rate for the aggregate stream of cells where in this particular embodiment $P_S$<=$P'_S$.

In this particular embodiment, every data cells that arrives at the regulator/shaper 100 with $B_{DS}$ unmarked cells already in the buffer 102 (which is a FIFO buffer in this particular embodiment) is marked by processing circuitry 108. In this particular embodiment, the processing circuitry 108 can mark a cell by setting a particular priority bit in the data cell, and once the data cell is marked, the cell remains marked. For example, in conventional ATM data packets, the processing circuitry 108 can set a CLP bit to 1 for marked (non-conforming) cells. When an unmarked cell gets to the head of the FIFO buffer 102 in this particular embodiment, the unmarked cell waits for available tokens in the unmarked token buffer 104, the unmarked peak rate line 110 and the aggregate peak rate line 112. If a token is available in all three in this particular embodiment, the tokens are used up, and join circuitry 120 permits the unmarked data cell to be output from the data buffer 42 and thus from the regulator/shaper 100.

When a marked cell arrives at the head of the buffer 102 in this particular embodiment, the marked cell needs available tokens in both the marked token buffer 106 and the aggregate peak rate line 112 for the join circuitry 120 to permit the output of the marked cell from the regulator/shaper 100. The marked cell in this particular embodiment does not wait for tokens. Upon the arrival of the marked cell, if either the marked token buffer 106 or the aggregate peak rate line 112 does not have an available token, the marked cell is dropped or lost. In accordance with certain aspects of this particular embodiment, if the unmarked cells are using less than the token rate r and the unmarked token buffer 104 is full, overflow tokens will flow into the marked token buffer 106. As such, the difference between r' and r as well as any unused portions of r is used by the marked cells.

In accordance with alternative embodiments according to the principles of the present invention, if $P_S'$ is made equal to $P_S$, the unmarked peak rate line 110 and any corresponding buffer 111 can be removed from the design of the regulator/shaper 100. If the aggregate output stream of data cells S' is not subject to mean rate regulation i.e., r'=∞, then the marked token buffer 106 and corresponding line can be removed from the design of the regulator/shaper 100 with some change in the logic of the join circuitry. If both the $P_S'$=P and the mean rate regulation is removed from the aggregate stream of data cells, the regulator/shaper can be reduced to the design of FIG. 13.

Figure 13:
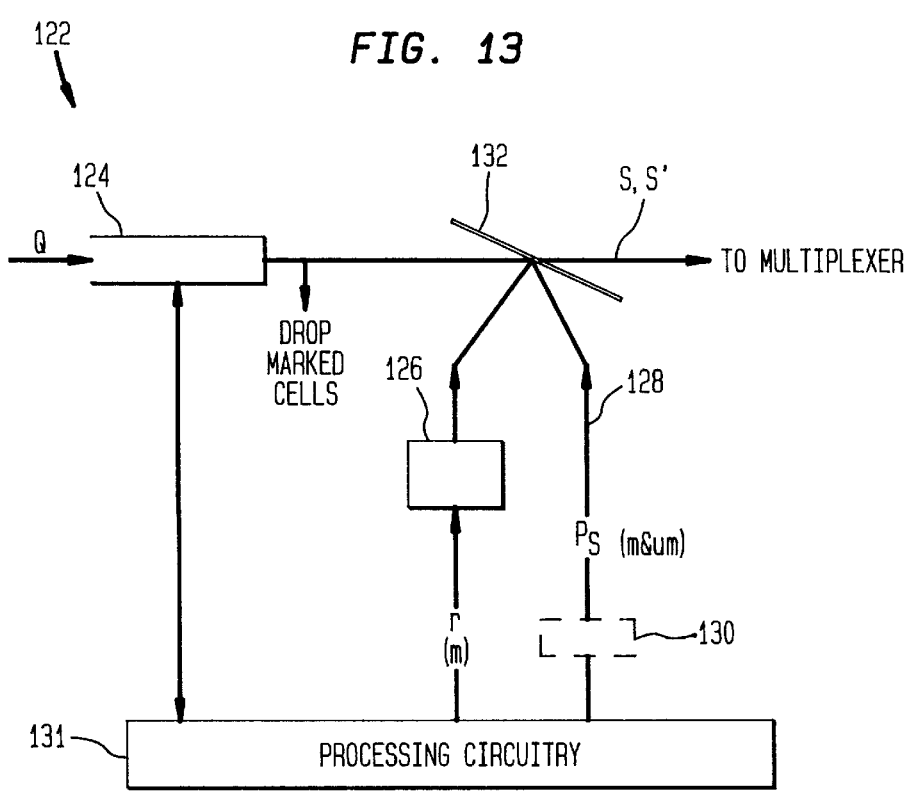
FIG. 13 shows an alternative embodiment for an integrated regulator and shaper according to certain principles of the present invention.

FIG. 13 shows a regulator/shaper 122 receiving an aggregate stream Q of conforming and non-conforming data cells into a data buffer 124 shown with unlimited size. In this particular embodiment, the token buffer 126 receives tokens at the mean token rate r and the aggregate peak rate line 128 provides tokens for the aggregate (conforming and non-conforming) data cells from a aggregate peak token buffer 130 which holds one token and receives tokens at a rate $P_S$. In this particular embodiment, an arriving data cell is marked by processing circuitry 131 if $B_{DS}$ unmarked cells are in the data buffer 124. An unmarked data cell is output from the regulator/shaper 122 by the join circuitry 132 if a token is available on the aggregate peak line 128. If not, the unmarked data cell waits for the tokens. Upon arrival to the head of the data buffer 124, a marked cell is output from the regulator/shaper 122 by the join circuitry 132 if a token is available in both the token buffer 126 and the aggregate peak line 128. If not, the marked token is dropped or lost.

Alternative configurations of the traffic shaping system are possible which omit or add components, use different parameters, use different criteria for marking data cells and/or perform variations of the above-described control scheme. For example, the traffic shaping system embodiment of FIG. 13 can use a variation of the control scheme by outputting unmarked data cells from the regulator/shaper 122 when tokens are present on both the token buffer 126 and on the aggregate peak line 128. Alternatively, marked cells may be permitted to wait for tokens if no unmarked cells are in the data buffer 124. Other alternatives can be used which are encompassed by the principles of the present invention to increase nodal capacity by regulating and shaping data cells at the ingress to the node. Furthermore, the principles of the traffic shaping system can be used to shape data cells at the egress of the node.

Additionally, the traffic shaping system has been described as being comprised several simple components, such as a dual leaky bucket regulator, but it should be understood that the traffic shaping and portions thereof can be employed using other forms of regulators and shapers, application specific integrated circuits, software driven processing circuitry, or other arrangements of discrete components. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

We claim:

1. A network node system comprising:

a regulator arrangement having a first regulator configured to receive a first stream of cells of a first delay sensitive class and a second regulator configured to receive a second stream of cells of a second delay tolerant class, said first regulator produces a first stream of conforming cells of said first class and said second regulator producing a second stream of conforming cells of said second class based on at least one parameter for said second regulator;

a shaping arrangement configured to receive said second stream of conforming cells of said second class and to shape said second stream of conforming cells cells constrained by a delay bound for said second class and said at least one parameter for said second regulator, said shaping arrangement produces a shaped stream of conforming cells of said second class in parallel with said first stream of conforming cells of said first class from said first regulator.

2. The system of claim 1 wherein said shaping arrangement including a data buffer receiving said conforming cells of said second stream of said second class to buffer said conforming cells of said second stream of said second class.

3. The system of claim 2 wherein said shaping arrangement provides shaped cells from said second stream of conforming cells of said second class and said regulator arrangement provides said first stream of conforming cells of said first class to a multiplexer with a buffer and an output port.

4. A method of increasing the connection capacity of a network node comprising the steps of:

providing a regulator with a token buffer of size Bt, a rate r and a peak rate P and a shaper with a token buffer of size Bts, a data buffer of size Bds, and a peak shaping rate of Ps; and selecting at least one of parameters Bds, Bts and Ps for said shaper using a delay bound and at least one of the parameters Bt, r and P.

5. The method of claim 4 wherein said step of selecting further includes the step of:

selecting said peak rate Ps for the traffic shaping system to satisfy a constraint P−r*Ds*(P−r)/Bt.

6. An integrated traffic shaping system for a network node, said traffic shaping system comprising:

a data buffer receiving an aggregate stream of marked and unmarked cells; and a shaping arrangement receiving said aggregate stream of cells from said data buffer, said shaping arrangement includes a token buffer of size Bts which receives tokens at a first token rate and a aggregate peak line which provides tokens at a aggregate peak rate, said shaping arrangement provides an unmarked cell if a token is present on said aggregate peak line and provides a marked cell if a tokens are present on said aggregate peak line and in said token buffer.

7. The system of claim 2 wherein said second regulator including a token buffer of size Bt a mean rate r and a peak rate P, said shaping arrangement comprises a shaper for said second stream of said conforming cells of said second class, said shaper having a token buffer of size Bts, a data buffer of size Bds, and a peak shaping rate of Ps, at least one of said parameters Bds, Bts and Ps being determined for said shaper using a delay bound on said shaper and at least one of the parameters Bt, r and P.

8. The method of claim 7 wherein said regulator being a dual leaky bucket regulator.

9. The method of claim 4 wherein said step of selecting further includes the step of:

selecting said data buffer size Bds for the traffic shaping system to satisfy a constraint r*Ds.

10. The method of claim 4 wherein said step of selecting further includes the step of:

selecting said token buffer size Bts for the traffic shaping system to satisfy a constraint Bt−r*Ds.

11. The method of claim 6 wherein said shaping arrangement further comprising:

an unmarked token buffer which receives tokens at an unmarked rate;

an unmarked peak rate line which provides tokens at an unmarked peak rate; and said shaping arrangement provides said unmarked cell if tokens are present in said unmarked token buffer, on said unmarked peak rate line and on said aggregate peak rate line.

12. A method of processing cells in a network, said method comprising the steps of:

receiving a first stream of cells of a first delay sensitive class and a second stream of cells of a second delay tolerant class;

regulating said first stream of cells to produce a first stream of conforming cells of said first class;

regulating said second streams of cells of said second class based on at least one parameter to produce a second stream of conforming cells;

shaping said second stream of conforming cells of said second class constrained by said at least one parameter and a delay bound for said second class; and producing a shaped stream of conforming cells of said second class in parallel with said first stream of conforming cells of said first class.

13. The method of claim 12 wherein said step of regulating further including the step of using a dual leaky bucket regulator.

14. A method of process cells in a network, said method comprising the steps of:

receiving an aggregate stream of marked and unmarked cells in a buffer;

providing tokens on an aggregate peak rate line at an aggregate peak rate;

providing tokens to a token buffer at a first token rate;

producing an unmarked cell if a token is present on an aggregate peak rate line; and producing a marked cell if tokens are present on said aggregate peak rate line and in said token buffer.

15. The method of claim 14 further comprising the steps of:

providing tokens to an unmarked token buffer at an unmarked rate;

providing tokens on an unmarked peak rate line which provides tokens at an unmarked peak rate; and producing said unmarked cell if tokens are present in said unmarked token buffer, on said unmarked peak rate line and on said aggregate peak rate line.

16. An integrated traffic regulating and shaping system for a network node, said traffic shaping system comprising:

a data buffer receiving a stream of cells of a first class having a peak rate P and a mean rate; and a regulating and shaping arrangement receiving said stream of cells from said data buffer, said shaping arrangement includes a token buffer which receives tokens at said mean rate and a peak shaping rate line which provides tokens at a peak shaping rate Ps<=P, said shaping arrangement provides a cell if a token is present on said token buffer and on said peak shaping line.

17. A method of regulating and shaping cells in a network, said method comprising the steps of:

receiving a stream of cells of a first class having a peak rate P and a mean rate in a buffer;

providing tokens on a peak shaping rate line at a peak shaping rate Ps<=P;

providing tokens to a token buffer at said mean rate; and producing a cell if a token is present on said peak shaping rate line and in said token buffer.

* * * * *